United States Patent
Khalid

(10) Patent No.: US 8,844,264 B2
(45) Date of Patent: Sep. 30, 2014

(54) GAS TURBINE ENGINE WITH EJECTOR

(75) Inventor: Syed Jalaluddin Khalid, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 558 days.

(21) Appl. No.: 13/191,038

(22) Filed: Jul. 26, 2011

(65) Prior Publication Data

US 2011/0277483 A1 Nov. 17, 2011

Related U.S. Application Data

(63) Continuation-in-part of application No. 12/604,759, filed on Oct. 23, 2009, now Pat. No. 8,572,947, which is a continuation-in-part of application No. 12/604,776, filed on Oct. 23, 2009, now abandoned.

(60) Provisional application No. 61/204,004, filed on Dec. 31, 2008, provisional application No. 61/367,679, filed on Jul. 26, 2010.

(51) Int. Cl.
| | |
|---|---|
| *F02K 3/02* | (2006.01) |
| *F02K 1/36* | (2006.01) |
| *B64C 7/02* | (2006.01) |
| *F02K 3/077* | (2006.01) |
| *B64D 33/02* | (2006.01) |

(52) U.S. Cl.
CPC ............. *B64C 7/02* (2013.01); *F05D 2270/17* (2013.01); *F02K 1/36* (2013.01); *B64D 2033/0226* (2013.01); *F05D 2260/601* (2013.01); *F02K 3/077* (2013.01)
USPC ............................ 60/226.1; 60/262

(58) Field of Classification Search
USPC ............. 60/226.1, 226.3, 262, 266, 770, 785, 60/228, 795; 244/130, 200, 204, 206–208, 244/211, 21, 212
See application file for complete search history.

(56) References Cited

U.S. PATENT DOCUMENTS

| | | | | |
|---|---|---|---|---|
| 2,659,552 | A | * | 11/1953 | Stalker .......................... 244/209 |
| 2,972,860 | A | | 2/1961 | Moy |
| 3,317,162 | A | | 5/1967 | Grant |
| 3,409,228 | A | | 11/1968 | Mehr |
| 3,432,100 | A | | 3/1969 | Hardy et al. |
| 3,572,960 | A | | 3/1971 | McBride |
| 3,591,085 | A | | 7/1971 | Medawar et al. |

(Continued)

OTHER PUBLICATIONS

International Search Report and Written Opinion, PCT/US2011/045345, Rolls-Royce Corporation, Jan. 5, 2012.

*Primary Examiner* — Phutthiwat Wongwian
(74) *Attorney, Agent, or Firm* — Krieg DeVault LLP

(57) ABSTRACT

Disclosed is a boundary layer ejector fluidically connecting boundary layer bleed slots from an external surface of an aircraft to reduce aircraft/nacelle/pylon drag, reduce jet noise and decrease thrust specific fuel consumption. A boundary layer withdrawn through the boundary layer bleed slots is entrained with an exhaust flow of a gas turbine engine. In another embodiment a boundary layer withdrawn through the boundary layer bleed slots is entrained with a flow stream internal to the gas turbine engine, such as a fan stream of a turbofan. A moveable shroud can be used to open and close a passage of an ejector which can be used to assist in withdrawing a boundary layer or entrain an ambient air. A lobed mixer can be used in some embodiments to effect mixing between the boundary layer and a primary fluid of the ejector.

14 Claims, 5 Drawing Sheets

(56) References Cited

U.S. PATENT DOCUMENTS

| | | |
|---|---|---|
| 3,591,087 A | 7/1971 | Tontini |
| 3,710,890 A | 1/1973 | True et al. |
| 4,018,046 A | 4/1977 | Hurley |
| 4,043,121 A | 8/1977 | Thomas et al. |
| 4,052,847 A | 10/1977 | Rodgers et al. |
| 4,193,262 A | 3/1980 | Snell |
| 4,295,332 A | 10/1981 | Steyer et al. |
| 4,466,587 A | 8/1984 | Dusa et al. |
| 4,493,184 A | 1/1985 | Nikkanen et al. |
| 5,136,837 A | 8/1992 | Davison |
| 5,137,230 A | 8/1992 | Coffinberry |
| 5,263,667 A * | 11/1993 | Horstman .................. 244/209 |
| 5,284,012 A | 2/1994 | Laborie et al. |
| 5,435,127 A | 7/1995 | Luffy et al. |
| 5,586,431 A | 12/1996 | Thonebe et al. |
| 5,746,047 A | 5/1998 | Steyer et al. |
| 5,782,077 A | 7/1998 | Porte |
| 5,884,873 A | 3/1999 | Breit |
| 5,941,065 A | 8/1999 | Lidstone et al. |
| 6,094,907 A | 8/2000 | Blackner |
| 6,216,982 B1 | 4/2001 | Pfennig et al. |
| 6,295,805 B1 | 10/2001 | Lackey et al. |
| 6,301,877 B1 | 10/2001 | Liang et al. |
| 6,983,602 B2 | 1/2006 | Senile |
| 6,988,674 B2 | 1/2006 | Steyer et al. |
| 7,048,230 B2 | 5/2006 | Meyer |
| 7,200,999 B2 | 4/2007 | Bagnall et al. |
| 7,364,117 B2 | 4/2008 | Dionne |
| 7,424,805 B2 | 9/2008 | Johnson |
| 7,607,305 B2 | 10/2009 | Steyer et al. |
| 7,607,306 B2 | 10/2009 | Steyer et al. |
| 7,770,381 B2 | 8/2010 | Johnson et al. |
| 2002/0092948 A1 | 7/2002 | Dugan |
| 2004/0089764 A1 | 5/2004 | McClure |
| 2005/0081530 A1 | 4/2005 | Bagnall et al. |
| 2005/0151026 A1 | 7/2005 | Meyer |
| 2007/0245711 A1 | 10/2007 | Stretton |
| 2008/0014078 A1 | 1/2008 | Suciu et al. |
| 2008/0296439 A1 | 12/2008 | Cloft et al. |
| 2009/0155046 A1 | 6/2009 | Haas |
| 2009/0165995 A1 | 7/2009 | Bajusz et al. |
| 2009/0217643 A1 | 9/2009 | Sokhey et al. |
| 2009/0314004 A1 | 12/2009 | Van Der Woude |
| 2010/0162679 A1 | 7/2010 | Khalid |

\* cited by examiner

GAS TURBINE ENGINE WITH EJECTOR

CROSS REFERENCE TO RELATED APPLICATIONS

The present application is a continuation-in-part of U.S. patent application Ser. No. 12/604,759 filed Oct. 23, 2009 and of U.S. patent application Ser. No. 12/604,776 filed Oct. 23, 2009, which claim the benefit of U.S. Provisional Patent Application 61/204,004, and this application also claims the benefit of U.S. Provisional Patent Application 61/367,679 filed Jul. 26, 2010, all of which are incorporated herein by reference.

FIELD OF THE INVENTION

The present invention generally relates to gas turbine engines useful in removing a boundary layer of air, and more particularly, but not exclusively, to integrated aircraft engine with an ejector having fluid supplied by boundary layer bleed flow.

BACKGROUND

Challenges remain in providing aircraft propulsion systems capable of producing high thrust, emitting low jet noise, minimizing installation drag, minimizing fuel consumption, and ensuring fuel and lubrication temperatures are within specification requirements, among potential other challenges. The present inventions address problems associated with existing propulsion systems by providing a novel and non-obvious contributions relating thereto.

SUMMARY

One embodiment of the present invention is a unique gas turbine engine ejector for removing a boundary layer from a flow surface. Other embodiments include apparatuses, systems, devices, hardware, methods, and combinations for removing a boundary layer through an ejector action. Further embodiments, forms, features, aspects, benefits, and advantages of the present application shall become apparent from the description and figures provided herewith.

The present inventions include a boundary layer ejector fluidically connecting boundary layer bleed slots from an external surface of an aircraft/nacelle/pylon to reduce aircraft drag, reduce jet noise and decrease thrust specific fuel consumption.

BRIEF DESCRIPTION OF THE DRAWINGS

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
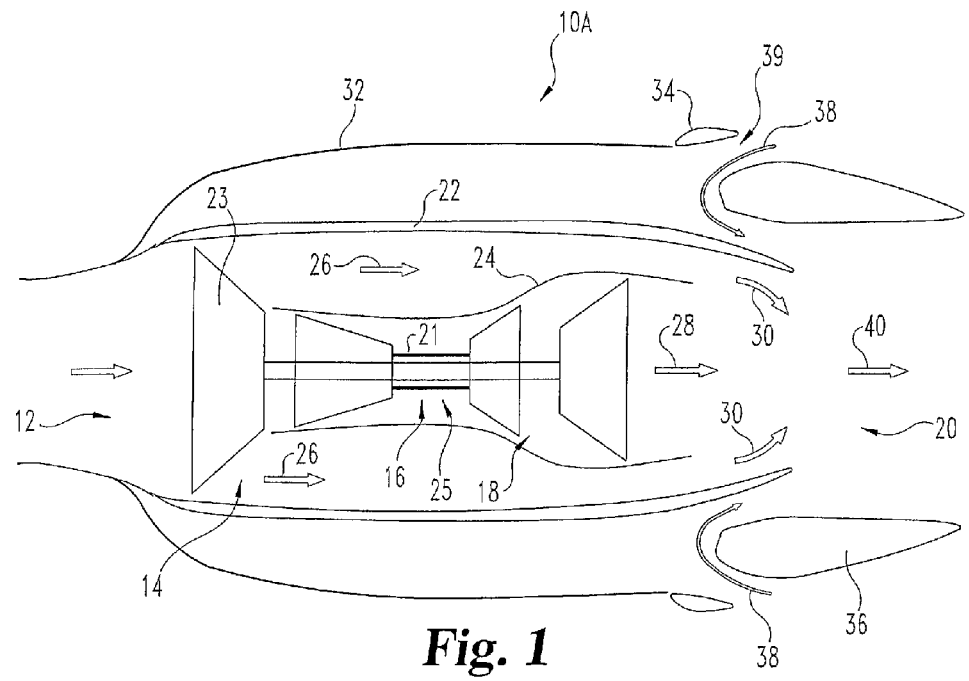
FIG. 1 is a schematic cross-sectional view of a prior art gas turbine engine with a nozzle ejector.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

One aspect of the present invention relates to a propulsion nozzle ejector utilizing boundary layer bleed to supply airflow to an ejector passageway. The disclosed ejector is operable to increase take-off thrust, reduce in-flight thrust specific fuel consumption, reduce installation and aircraft drag, reduce in-flight jet noise through a decrease in exhaust velocity, and provide a source of relatively low temperature airflow for thermal management of aircraft systems.

Boundary layer fluid flow is defined by the fluid in a layer adjacent to a body within which the major effects of viscosity are concentrated. In simplistic terms viscosity can be thought of as the thickness of the low velocity fluid or the resistance of the fluid to flow along a pathway. Viscous fluids create a boundary layer adjacent a body wherein the velocity of the fluid is approximately zero at the surface of the body and increases proportionally until it reaches the bulk fluid velocity outside of the boundary layer. The boundary layer produces losses due to aerodynamic drag on the aircraft. The boundary layer can be thought of as a dead zone wherein minimal useful fluid work can be done. The present invention advantageously removes at least a portion of boundary layer fluid and converts the boundary layer fluid into a useful means of increasing system efficiency and providing a source of thermal management.

Referring to FIG. 1, a prior art gas turbine engine 10A is illustrated. Components of the prior art engine 10A that are similar to the inventive engine 10B in FIG. 2, will have the same numerical description. The gas turbine engine 10A, as well as the inventive engine 10B, can take a variety of forms and in application can be used to provide power to an aircraft. In some embodiments the gas turbine engine 10A and/or 10B can be an adaptive cycle engine or a variable cycle engine. In other embodiments the gas turbine engine 10A and/or 10B can have any number of spools, including just one. In still further embodiments the gas turbine engine 10A and/or 10B can be a turbojet, turboprop, turbofan, or a turboshaft engine.

As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

The gas turbine engine 10A of the illustrative embodiment includes an inlet section 12, a compression section 14, a combustion section 16, an expansion or turbine section 18, and an exhaust section 20. In operation, air is drawn in through the inlet 12 and compressed to a high pressure relative to ambient pressure in the compression section 14. The air is mixed with fuel in the combustion section 16 wherein the fuel/air mixture burns and produces a high temperature and pressure working fluid from which the turbine section 18 extracts power. The turbine section 18 is mechanically coupled to the compression section 14 via a shaft 21. The shaft 21 rotates about a centerline axis that extends axially along the longitudinal axis of the engine 10A, such that as the turbine section 18 rotates due to the forces generated by the high pressure working fluid the compression section 14 is rotatingly driven by the turbine section 18 to produce compressed air.

The compression section 14 can optionally include a low-pressure fan 23 which produces a bypass flow stream represented by arrow 26. The bypass flow stream 26 flows between an outer case 22 and an inner faring 24 that encompasses the core 25 of the engine 10A. The core 25 produces a core exhaust flow represented by arrow 28. Mixed engine exhaust flow represented by arrows 30 is the combined mass flow of the bypass flow 26 and the core flow 28.

A nacelle 32 encompasses the outer case 22 of the engine 10A. A variable flap 34 is positioned adjacent the aft end of the nacelle 32. In other embodiments, however, the variable flap 34 can be located at positions other than adjacent the aft end of the nacelle 32. A nozzle 36 is positioned further aft of the variable flap 34 in the illustrative embodiment. When the variable flap 34 is in an open position a nozzle ejector flow 38 can be entrained through a passageway 39 formed between the variable flap 34 and the nozzle 36. In some embodiments, however, the passageway 39 can be formed between the variable flap 34 and a structure or structures other than the nozzle 36. A total exhaust flow represented by arrow 40 includes the mixed engine exhaust flow 30 and the nozzle ejector flow 38.

Figure 2:
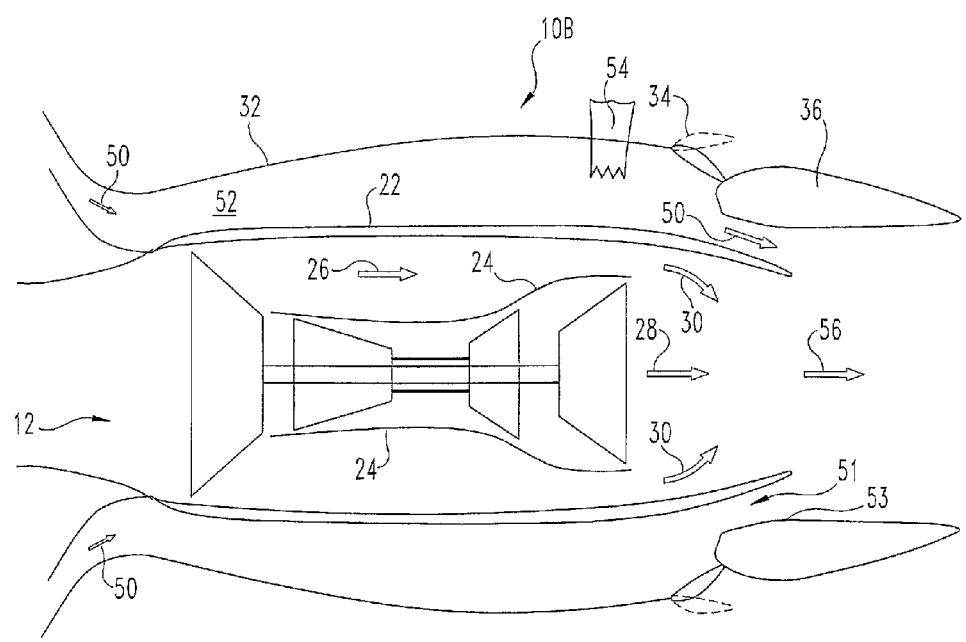
FIG. 2 is a schematic cross-sectional view of a gas turbine engine with a boundary layer ejector according to the present application.

Referring to FIG. 2, a gas turbine engine 10B is illustrated having novel features relative to the gas turbine engine 10A. The gas turbine engine 10B includes boundary layer bleed flow represented by arrow 50. The boundary layer bleed flow 50 can be transported through bleed ports (not shown in FIG. 2 but described and shown further below) from any surface of the engine 10B or aircraft (also not shown in FIG. 2 but described and shown further below) and directed through a nacelle passageway 52. The bleed ports can take any variety of forms including slots or holes, among potential others. As a matter of convenience of description, therefore, the term "bleed port" can refer to any of these types of configurations. The surface from which the boundary layer bleed flow 50 originates from can be any surface which is exposed to a moving fluid. Such surfaces include the outside portion of a nacelle exposed to the free stream, the inside surface forming part of the passageway through which the bypass flow stream passes, among potential other surfaces.

In some embodiments one or more heat exchangers 54 can be disposed within the passageway 52 to remove heat from system components (not shown). The one or more heat exchangers 54 can take a variety of forms and, in those applications in which multiple heat exchanges 54 are used, not all need be the same. The temperature of the boundary layer bleed flow 50 can be approximately the same as the ambient temperature, therefore at altitude the boundary layer bleed flow 50 can provide a large heatsink. In those embodiments having one or more heat exchangers, after the boundary layer bleed flow 50 passes the heat exchanger 54, the flow can be accelerated through a channel 51 between the nozzle 36 and the outer case 22. Whether or not heat exchangers are present, however, it will be understood that the channel 51 can be of an orientation to permit the flow to be accelerated. For example, the channel 51 can have a smaller cross sectional area relative to the passageway 52 at locations upstream of the channel 51.

In some applications a channel member 53 can be used to selectively vary the cross sectional area of the channel 51, and in particular can be used to change the exit area of the passageway 52. The channel member 53 can be actuated at a variety of rates which can depend on properties of a total exhaust flow 56 which is the boundary layer bleed flow 50 mixed with the bypass flow 26 and the core flow 28. Removing boundary layer flow from external surfaces reduces the drag and the additional mass flow added into the total exhaust flow 56 increases the thrust of the engine 10B.

In the takeoff and taxi mode the variable flap 34 can be opened as shown in the dashed outline which permits air to enter from the rear and go around the ejector leading edge into the exhaust stream 56, similar to that depicted in FIG. 1. The integrated static pressure around the ejector results in a thrust component while the jet noise is reduced as a result of reduced exhaust velocity. In cruise mode, the variable flap 34 can be closed as depicted by the solid outline in FIG. 2. Boundary layer bleed air 50 is then pulled from passageways connected to a surface associated with any of the nacelle, pylon, wing, or fuselage or other locations that a boundary layer can build up on. The resulting removal of the boundary layer reduces the installation/aircraft drag. The RAM effect during cruise in conjunction with ejector pumping can effectively remove the boundary layer especially since the ejector is being driven by a high velocity (normally sonic but can be supersonic) and high mass flow primary nozzle 36 which will entrain a large amount of secondary flow. Ejector pumping can be further enhanced by forming the shroud, concentric surface, or other structure that separates the primary nozzle flow from the secondary boundary layer flow as a lobed mixer configuration. Such a configuration can assist in forcing mixing between the two flows and permit shortening of the engine length.

Figure 3:
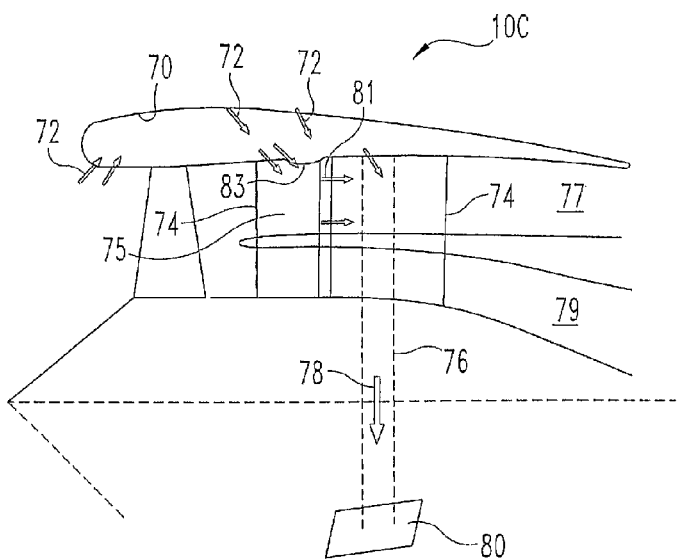
FIG. 3 is a schematic cross-sectional view of a portion of a gas turbine engine with a boundary layer ejector according an alternate embodiment of the present application.

Referring to FIG. 3, an alternate engine configuration 100 is depicted. It will be appreciated, however, that the alternate engine configuration can have a number of the variations described above with respect to the gas turbine engines 10A and/or 10B. A nacelle 70 can include boundary layer bleed ports 72 fluidically connected to a member 74 or the like extending at least partially across the flow path depicted. The member 74 can take the form of a strut, an outlet guide vane, or other type of member disposed within the flow path. The member includes a passage 75 through which a boundary layer which has been pulled through boundary layer bleed ports 72 can pass. The passage 75 can be the hollow interior of the member 74, but can also take other forms in different embodiments. In some embodiments the passage 75 can extend across the bypass flow path 77 and the core flow path 79. In some forms the member 74 can include one or more exit apertures 81 through which the boundary layer which has been pulled through boundary layer bleed ports 72 can pass after passing through the passage 75. The one or more exit apertures 81 can be formed in or near the trailing edge of the member 74. In some forms a conduit 76 can be provided in a member 74 which is operable to carry relatively cool boundary layer bleed air 78 to one or more components 80 within the engine 100 requiring cooling flow. For example the component 80 can be an electronic apparatus or a relatively hot mechanical apparatus such as a combustion or turbine component. Though the conduit 76 is depicted in a member 74 downstream of the member 74 having the exit apertures 81, it will be appreciated that the conduit 76 can be provided in the member 74 shown as having the apertures 81, but in an embodiment that otherwise lacks the apertures 81. In other words, in lieu of or in addition to the aperture 81, the member 74 can include the conduit 76. In still further embodiments the conduit 76 can lead to an ejector such as the nozzle ejector depicted in the embodiments of FIG. 2.

In some forms the alternate engine configuration 100 can be used to remove a boundary layer through boundary layer bleed ports 72 to increase inlet pressure recovery and reduce pressure distortion seen by the fan. The resulting higher pressure recovery increases thrust and lowers specific fuel consumption. The lower pressure distortion increases stall margin.

In some forms the engine 100 can include a flow path protrusion 83 that can reduce the cross sectional area of the bypass flow path 77 at that location. For example, in some forms outlet guide vanes (OGV's) are provided to eliminate circumferential swirl and can have a flow area that increases from the leading to the trailing edge. The inner and outer walls of the OGV's can be tapered to reduce the area increase thus increasing the OGV exit velocity and ejector pumping. The flow path protrusion 83 can be used to locally lower the pressure of the fluid passing through the bypass flow path 77 so that in the case of boundary layer which has been pulled through boundary layer bleed ports 72 and is discharged through the exit aperture 81 can be entrained by the flow through the bypass flow path 77. In one form the flow path protrusion 83 can be actuated and moved to a variety of positions to selectively lower or raise the local pressure and thus vary the ability of the flow through the bypass flow path 77 to entrain the boundary layer which has been pulled through boundary layer bleed ports 72.

Figure 4A:
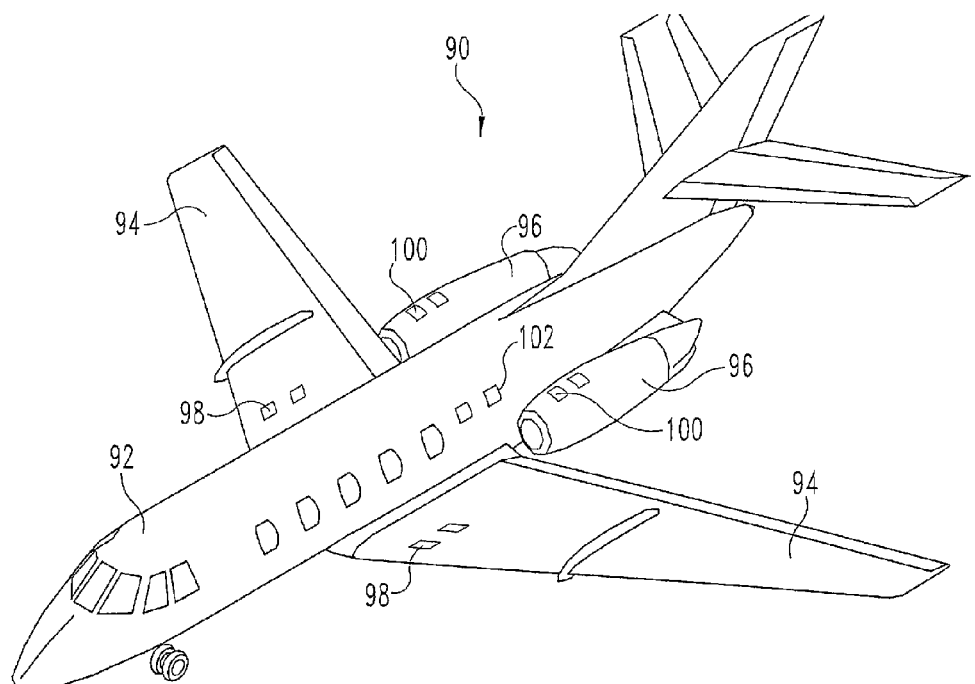
FIG. 4a is a perspective view of one form of aircraft using the boundary layer ejector of the present application.

Referring now to FIG. 4a an aircraft 90 is depicted having a fuselage 92 with wings 94 extending therefrom and gas turbine engines 96 mounted thereon. The wings 94 can include a plurality of bleed slots 98 for removing boundary layer flow from the wings 94 and delivering said flow to the ejector nozzle or other components disposed on the aircraft 90, such as through any of the various embodiments discussed herein. In addition to or alternatively, nacelle bleed slots 100 and fuselage bleed slots 102 can be utilized for removing boundary layer flow. Referring briefly to FIG. 4d, in some aircraft configurations the Mach number in the passage located between the nacelle 146 and the fuselage 148 could increase because of the blockage created by the boundary layer thus resulting in increased installation drag. Removal of this boundary layer through one or more of the bleed slots 144 depicted in FIG. 4d can result in decreased drag. The bleed slots 144 can be located on either or both of the fuselage 148 or nacelle 146.

Figure 4B:
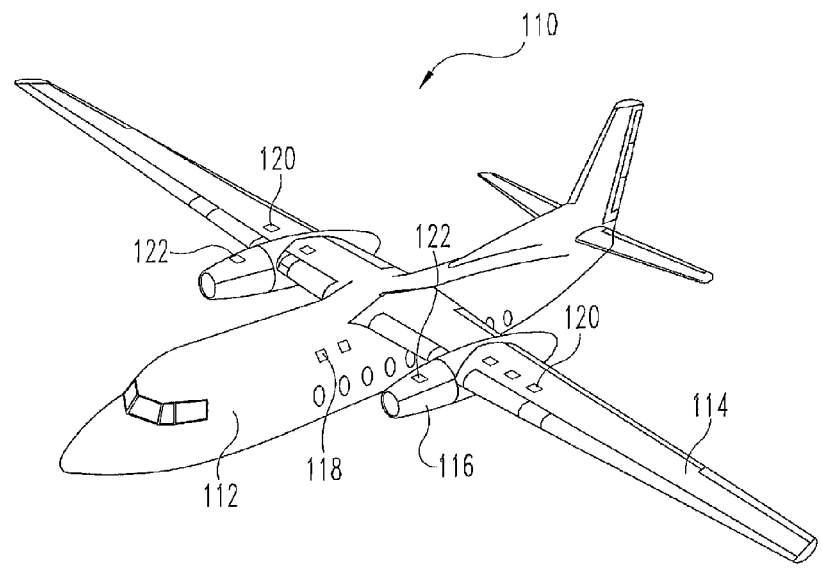
FIG. 4b is a perspective view of another form of aircraft using the boundary layer ejector of the present application.

Referring to FIG. 4b, an alternate aircraft configuration 110 is depicted with wing 114 mounted engines 116. Similar to the aircraft of FIG. 4a the fuselage 112, the wings 114, and the engines 116 can all include boundary layer bleed slots 118, 120 and 122 respectively.

Figure 4C:
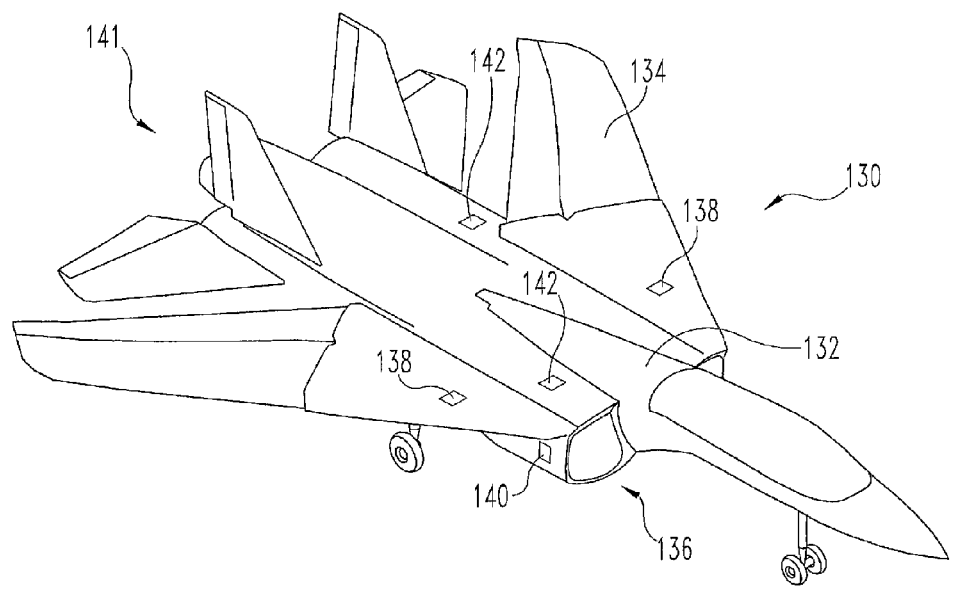
FIG. 4c is a perspective view of yet another form of aircraft using the boundary layer ejector of the present application.
Figure 4D:
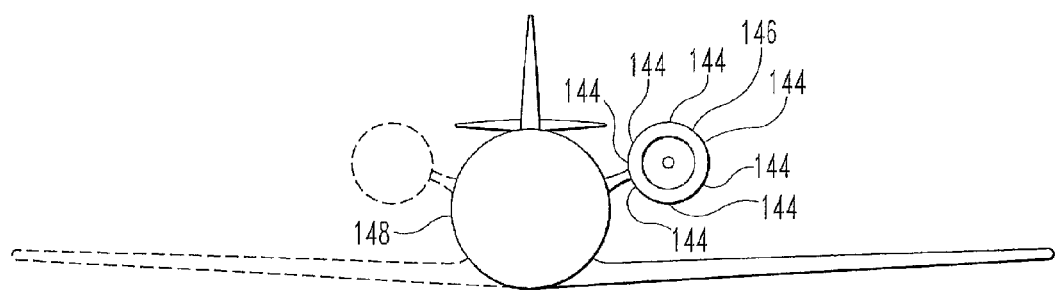
FIG. 4d is a front view of an aircraft having one embodiment of the present application.

In yet another aircraft configuration, FIG. 4c illustrates a military style aircraft 130 wherein the engines 136 are embedded within a fuselage 132. Again, similar to the previous aircraft of FIGS. 4a and 4b the fuselage 132, a nacelle 141 surrounding the engine 136 and the wings 134, can all include boundary layer bleed slots 142, 140, and 138 respectively. The slots can also be located between the inlet and the fuselage (sometimes referred to as the "arm pit") where the fuselage boundary layer can thicken.

It should be understood that the boundary layer bleed slots can be positioned anywhere on the aircraft and/or engine and are not limited by the examples disclosed in the present application. Any type of aircraft or spacecraft that can advantageously use the teachings of this disclosure is contemplated by the present invention.

Figure 5:
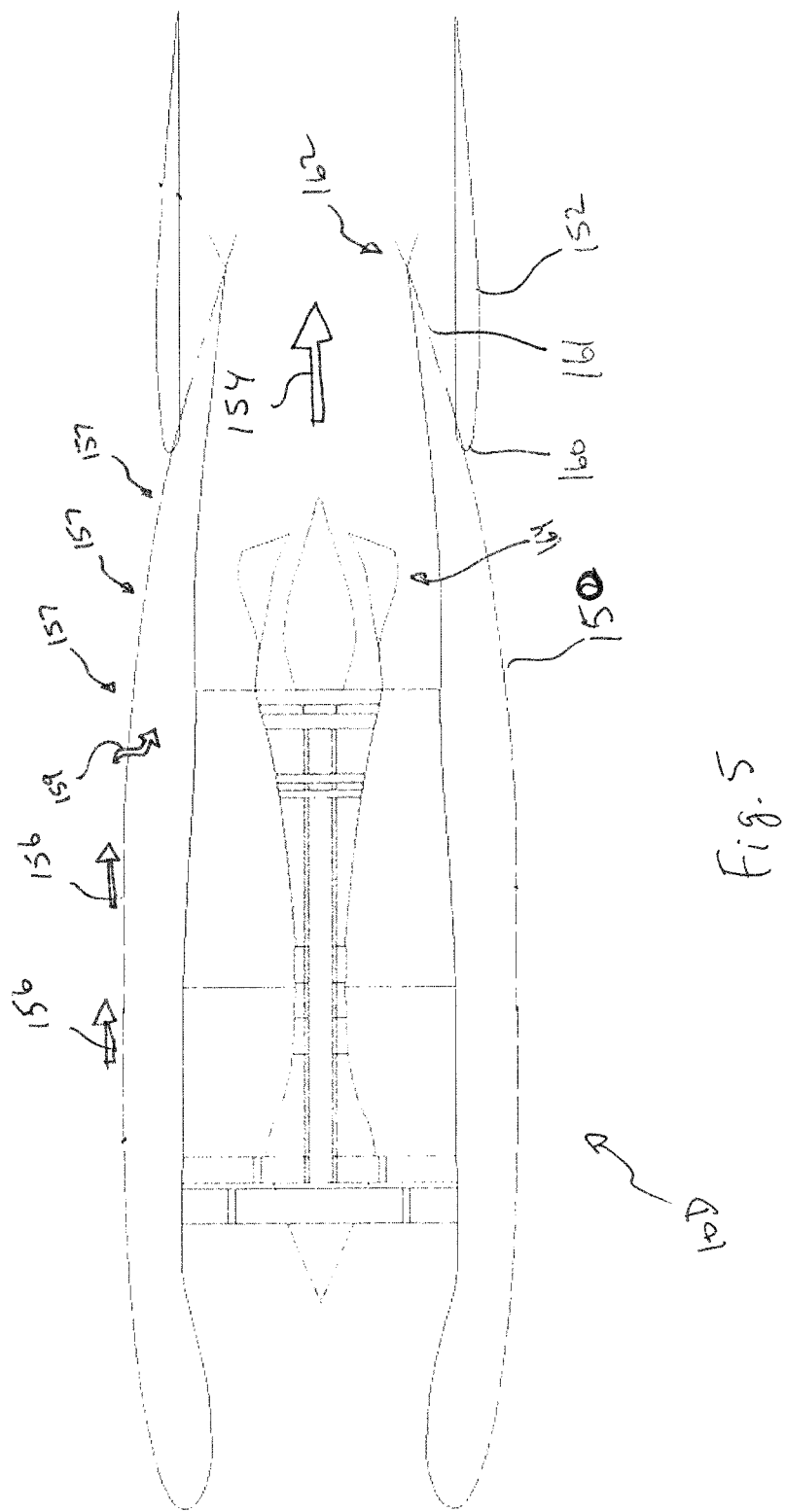
FIG. 5 is a view of another embodiment of the present application.

Turning now to FIG. 5, another embodiment of the present application includes a gas turbine engine 10D enclosed by a nacelle 150. The gas turbine engine 10D can take any variety of forms including the variations described above with regard to any of the engines 10A, 10B, and 100. The nacelle 150 generally surrounds the gas turbine engine 10D and in one form is annular in shape. The nacelle 150 can extend upstream and downstream of the turbomachinery in the gas turbine engine, but can have alternative configurations in other embodiments. In some applications the nacelle 150 would be recognized as the structure surrounding a gas turbine engine on a pylon mounted turbofan engine, to set forth just one non-limiting example of a type of pylon mounted gas turbine engine. In other applications the nacelle 150 can be the structure that provides an outer flow path boundary for a gas turbine engine, such as an aft fuselage region of a tail mounted engine like a Boeing 727, Boeing DC-10, or Lockheed L-1011, to set forth just a few non-limiting examples. In short, the nacelle 150 described herein provides a structure that at least partially surrounds a gas turbine engine and forms a flow path for a free stream.

An ejector shroud 152 is positioned near an aft end of the nacelle 150 and is used to form a flow path to entrain a boundary layer formed on the nacelle 150 with a gas turbine engine flow 154. The gas turbine engine flow 154 can take a variety of forms depending on the engine type used. In some embodiments the gas turbine engine flow 154 can be a bypass flow from a turbofan engine, a core flow, or a combination of the two. Other forms of the flow 154 are also contemplated. An arrow designated with reference numeral 156 represents a nacelle flow on the exterior of the nacelle that is entrained with the gas turbine engine flow 154. The nacelle flow 156 can be boundary layer formed on the nacelle 150, a portion of the boundary layer formed on the nacelle 150, or a mixture of a boundary layer formed on the nacelle 150 in addition to a free stream flow 158. In any event, the nacelle flow 156 is entrained with the gas turbine engine flow 154.

A boundary layer opening 157 is formed in the nacelle 150 and is used to withdraw the nacelle flow 156 into an inner portion of the nacelle 150 as shown by reference numeral 159. As described above, the nacelle flow 156 can include the boundary layer, a portion of the boundary layer, or a mixture of the boundary layer and the free stream. Once withdrawn through the boundary layer opening 157, the nacelle flow 156 can traverse through the nacelle 150 and exit through one or more openings 161 illustrated in the depicted embodiment.

The ejector shroud 152 can be shaped similar to the nacelle 150 and in some embodiments surrounds the entirety of the nacelle 150. For example, in various embodiments described above the ejector shroud 152 can take an annular shape and semi-annular shape, but other shapes will also be appreciated as well. For example, a rectangular shaped ejector shroud could be used when aircraft configurations call for it in any of the embodiments disclosed herein. A variety of shapes, therefore, are within the scope of the application. In addition, in some forms the ejector shroud 152 is set off a distance from nacelle 150 that is held constant around the periphery of the nacelle 150. In other forms, however, the ejector shroud 152 can have a varying offset from the nacelle 150. The ejector shroud 152 includes a leading edge 160 that can extend upstream of a trailing edge 162 of the nacelle a given distance. The ejector shroud 152 can extend downstream of the trailing edge 162 a variety of distances. Though the ejector shroud 152 is depicted as an airfoil shape in cross section, the ejector shroud 152 can take other shapes in different embodiments.

As will be appreciated in light of the embodiments above, the offset of the ejector shroud 152 from the nacelle 150 is created when an ambient flow is desired to be captured through ejector pump action, such as during taxi and low speed flight. Such an offset can be accomplished by moving the ejector shroud 152 relative to the nacelle 150. In the illustrated embodiment the ejector shroud can be moved by sliding forward and aft and can be accomplished using any variety of actuation techniques. An offset created between the ejector shroud 152 and nacelle 150 by relative movement between the two can be eliminated by moving the ejector shroud 152 such that a passage created between the two is closed. The offset can be created to permit ambient air to enter the ejector during taxi and slow speed flight, such as during takeoff. During relatively high speed flight, such as but not limited to cruise conditions, the ejector shroud 152 can be moved so that a boundary layer air can be removed through the boundary layer openings 157.

The flow area between the ejector shroud 152 and nacelle 150 can have a variety of sizes relative to the flow area through which flow 154 passes. In one application the flow area between the ejector shroud 152 and nacelle 150 can be about 60% the size of the flow area through which flow 154 passes.

In operation the ejector shroud 152 creates a relatively low pressure area on the downstream region of the nacelle 150 which serves to alleviate and/or eliminate an adverse pressure gradient in that region. Such a reduction and/or elimination of the adverse pressure gradient can prevent the boundary layer formed on the nacelle 150 from further growing, it can reduce the effect and size of the boundary layer in some applications, and additionally and/or alternatively can delay the onset of a flow separation.

As shown in the illustrated embodiment, the gas turbine engine 10D can include a mixer 164 useful in mixing a flow from a core of the engine and a flow from a bypass of the engine to create the gas turbine engine flow 154. Not all embodiments of the gas turbine engine 10D need be arranged as shown in the illustrated embodiment. The embodiment also depicts a ejector mixer 166 at a downstream end of the nacelle 150 useful to mix a primary flow of an ejector pump (in this case the flow 154) with a secondary flow of the ejector pump (in this case either the entrained boundary layer flow 159 when the shroud is engaged with the nacelle 150, or the flow of ambient air when the ejector shroud is displaced from the nacelle 150 as described above). Some embodiments can include the ejector mixer 166 while others may not. The mixer 164 and ejector mixer 166 can take a variety of forms that can, but need not, be the same. In some embodiments the mixers can be lobed mixers or shear mixers, to set forth just two non-limiting examples.

One aspect of the present application provides an apparatus comprising a gas turbine engine enclosed by an aircraft surface exposed to a free stream, the gas turbine engine having an exhaust flow path, a boundary layer bleed opening in the aircraft surface through which air from a boundary layer can be withdrawn, and an airflow member movable between an open position in which the airflow member does not contact an aircraft component and a closed position in which the airflow member engages the aircraft component, the closed position permitting boundary layer air passed through the boundary layer bleed opening to become entrained with the exhaust flow path of the gas turbine engine, the open position permitting ambient air to become entrained with the exhaust flow path.

A feature of the present application provides wherein the airflow member is slideable between the closed position and open position.

Another feature of the present application includes a passage between the boundary layer bleed opening and having an outlet at a location downstream of a portion of the airflow member that characterizes the open position and closed position.

Still another feature of the present application includes a plurality of boundary layer bleed openings formed in the aircraft surface, and wherein the aircraft component is the aircraft surface.

Yet still another feature of the present application provides wherein the aircraft surface is a nacelle.

Still yet another feature of the present application provides wherein the plurality of boundary layer bleed openings are structured to extract a boundary layer formed on a portion of the nacelle opposite an aircraft fuselage.

A further feature of the present application provides wherein the plurality of boundary layer bleed openings are distributed at different flow stations along a flow direction of the aircraft surface.

Another aspect of the present application provides an apparatus comprising an aircraft having an aircraft flow surface exposed to a free stream, the aircraft including a gas turbine engine having an exhaust flow path, a boundary layer bleed opening in the aircraft flow surface through which air from a boundary layer can pass, and an airflow member moveable between a flow path first position and a flow path second position of a flow path defined between the airflow member and the aircraft flow surface, the flow path first position permitting ambient air to become entrained with the exhaust flow path during operation, the flow path second position permitting boundary layer air passed through the boundary layer bleed opening to become entrained with the exhaust flow path of the gas turbine engine.

A feature of the present application provides wherein the airflow member is slideable and is capable of being placed at a variety of axial locations.

Another feature of the present application provides wherein the aircraft flow surface is a nacelle, and wherein the flow path first position is a relatively open position, and the flow path second position is a relatively closed position.

Still another feature of the present application provides wherein the airflow member is capable of engaging the aircraft flow surface at a location intermediate a forward end of the aircraft flow surface and an aft end of the aircraft flow surface.

Yet still another feature of the present application provides wherein the flow path second position discourages the ambient air to become entrained with the exhaust flow path during operation.

A further feature of the present application includes a plurality of boundary layer bleed openings and at least one passage between at least one of the plurality of boundary layer bleed openings and an exit located downstream of a leading edge of the airflow member.

Still yet another aspect of the present application provides a method comprising operating an aircraft having a gas turbine engine that produces a flow stream, moving a member to selectively open and close a flow passage of an ejector, ejector pumping a secondary fluid flow selected by a position of the member, a primary fluid flow of the ejector being the flow stream of the gas turbine engine, and withdrawing a boundary layer through an opening formed in an aircraft surface, the withdrawing enabled by the pumping.

One feature of the present application includes flowing the withdrawn boundary layer through a passage having an inlet upstream of the airflow member and an exit downstream of the airflow member.

Another feature of the present application provides wherein the primary fluid flow is a mixed flow of a core exhaust and a bypass passage of the gas turbine engine.

Still another feature of the present application includes mixing the secondary fluid flow with the primary fluid flow using a lobed mixer.

Yet still another feature of the present application provides wherein the ejector pumping occurs during cruise flight of the aircraft.

A further feature of the present application includes pumping an ambient air when the member is moved to a position and the withdrawing is discouraged.

A still further feature of the present application provides wherein the moving includes translating the member between a relatively open position and a relatively closed position.

A further aspect of the present application includes an apparatus comprising an aircraft having an fuselage and a nacelle housing an aircraft power plant, an external flow passage having opposing walls formed by the fuselage and the nacelle, a boundary layer bleed opening disposed in at least one of the opposing walls in the aircraft flow surface through which air from a boundary layer can pass into a passage internal to the at least one of the walls, and wherein during operation a pressure gradient is applied to the passage internal to the at least one of the walls such that a boundary layer formed in the external flow passage is pulled into the passage.

A feature of the present application provides wherein the pressure gradient is created by operation of an ejector, the ejector having a primary fluid flow and a secondary fluid flow, the secondary fluid flow being the boundary layer that has passed through the boundary layer bleed opening.

Another feature of the present application provides wherein the primary fluid flow is a stream of the aircraft power plant.

Still another feature of the present application provides wherein the aircraft power plant is a gas turbine engine, and wherein the primary fluid flow is an exhaust of the gas turbine engine.

Yet still another feature of the present application provides wherein the ejector includes a moveable member operable to open and close a passage, the moveable member configurable to permit an ambient air to enter the ejector.

Still yet another feature of the present application provides wherein the moveable member is structured to slidingly engage an aircraft structure.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus comprising:
    a gas turbine engine enclosed by an aircraft surface exposed to a free stream, the gas turbine engine having an exhaust flow path;
    a boundary layer bleed opening in the aircraft surface through which air from a boundary layer can be withdrawn; and
    an airflow member movable between an open position in which the airflow member does not contact an aircraft component and a closed position in which the airflow member engages the aircraft component, the closed position permitting boundary layer air passed through the boundary layer bleed opening to become entrained with the exhaust flow path of the gas turbine engine, the open position permitting ambient air to become entrained with the exhaust flow path;
    wherein the airflow member is slideable between the closed position and open position.

2. The apparatus of claim 1, which further includes a passage between the boundary layer bleed opening and having an outlet at a location downstream of a portion of the airflow member that characterizes the open position and closed position.

3. The apparatus of claim 2, which further includes a plurality of boundary layer bleed openings formed in the aircraft surface, and wherein the aircraft component is the aircraft surface.

4. The apparatus of claim 3, wherein the aircraft surface is a nacelle.

5. The apparatus of claim 4, wherein the plurality of boundary layer bleed openings are structured to extract a boundary layer formed on a portion of the nacelle opposite an aircraft fuselage.

6. The apparatus of claim 3, wherein the plurality of boundary layer bleed openings are distributed at different flow stations along a flow direction of the aircraft surface.

7. An apparatus comprising:
    an aircraft having an aircraft flow surface exposed to a free stream, the aircraft including a gas turbine engine having an exhaust flow path;
    a boundary layer bleed opening in the aircraft flow surface through which air from a boundary layer can pass; and
    an airflow member moveable between a flow path first position and a flow path second position of a flow path defined between the airflow member and the aircraft flow surface, the flow path first position permitting ambient air to become entrained with the exhaust flow path during operation, the flow path second position permitting boundary layer air passed through the boundary layer bleed opening to become entrained with the exhaust flow path of the gas turbine engine;
    wherein the airflow member is slideable between the flow path first position and the flow path second position.

8. The apparatus of claim 7, wherein the aircraft flow surface is a nacelle, and wherein the flow path first position is a relatively open position, and the flow path second position is a relatively closed position.

9. The apparatus of claim 7, wherein the airflow member is capable of engaging the aircraft flow surface at a location intermediate a forward end of the aircraft flow surface and an aft end of the aircraft flow surface.

10. The apparatus of claim 9, wherein the flow path second position discourages the ambient air to become entrained with the exhaust flow path during operation.

11. The apparatus of claim 7, which further includes a plurality of boundary layer bleed openings and at least one passage between at least one of the plurality of boundary layer bleed openings and an exit located downstream of a leading edge of the airflow member.

12. An apparatus comprising:
   an aircraft having an fuselage and a nacelle housing an aircraft power plant;
   an external flow passage having opposing walls formed by the fuselage and the nacelle;
   a boundary layer bleed opening disposed in at least one of the opposing walls in an aircraft flow surface through which air from a boundary layer can pass into a passage internal to the at least one of the walls; and
   wherein during operation a pressure gradient is applied to the passage internal to the at least one of the walls such that a boundary layer formed in the external flow passage is pulled into the passage;
   wherein the pressure gradient is created by operation of an ejector, the ejector having a primary fluid flow and a secondary fluid flow, the secondary fluid flow being the boundary layer that has passed through the boundary layer bleed opening;
   wherein the ejector includes a moveable member operable to open and close a passage, the moveable member configurable to permit an ambient air to enter the ejector; and
   wherein the moveable member is structured to slidingly engage an aircraft structure.

13. The apparatus of claim 12, wherein the primary fluid flow is a stream of the aircraft power plant.

14. The apparatus of claim 13, wherein the aircraft power plant is a gas turbine engine, and wherein the primary fluid flow is an exhaust of the gas turbine engine.

\* \* \* \* \*